United States Patent [19]

Sabo

[11] 4,236,558
[45] Dec. 2, 1980

[54] WOODWORKING TECHNIQUE FOR FORMING CORNERS

[76] Inventor: Irving Sabo, Box 32, Green Farms, Conn. 06436

[21] Appl. No.: 37,048

[22] Filed: May 8, 1979

[51] Int. Cl.³ .............................................. B27H 1/00
[52] U.S. Cl. .................................. 144/318; 29/526 R; 144/254; 144/270; 144/309 B; 144/327; 217/65
[58] Field of Search ........................ 5/200 C; 52/631; 144/254, 270, 271, 324, 327, 318, 309 B, 317; 217/1, 2, 65, 69; 29/406, 428, 526 R

[56] References Cited

U.S. PATENT DOCUMENTS

| 963,491 | 7/1910 | Whitmore | 144/270 |
| 2,505,789 | 5/1950 | Norquist | 52/631 |

FOREIGN PATENT DOCUMENTS 1409726  7/1965  France ..................................... 144/270

Primary Examiner—W. Donald Bray
Attorney, Agent, or Firm—Michael Ebert

[57] ABSTRACT

A woodworking technique for creating an angled corner in a straight wood piece. Formed on the inner side of the piece is a cut-out that is symmetrical with respect to a transverse reference line, the cut-out being constituted by a converging entry zone whose opposing flat sides have complementary angles each equal to one-half of the corner angle, the entry zone leading into an oblong interior zone whose opposing arcuate sides follow the curvature of a pair of circles. The wood bridge joining the arcuate sides of the interior zone is steamed to permit bending thereof to cause the arcuate sides to meet and the flat sides to abut on the reference line, thereby defining a circular socket for receiving a leg or other furniture component.

8 Claims, 4 Drawing Figures

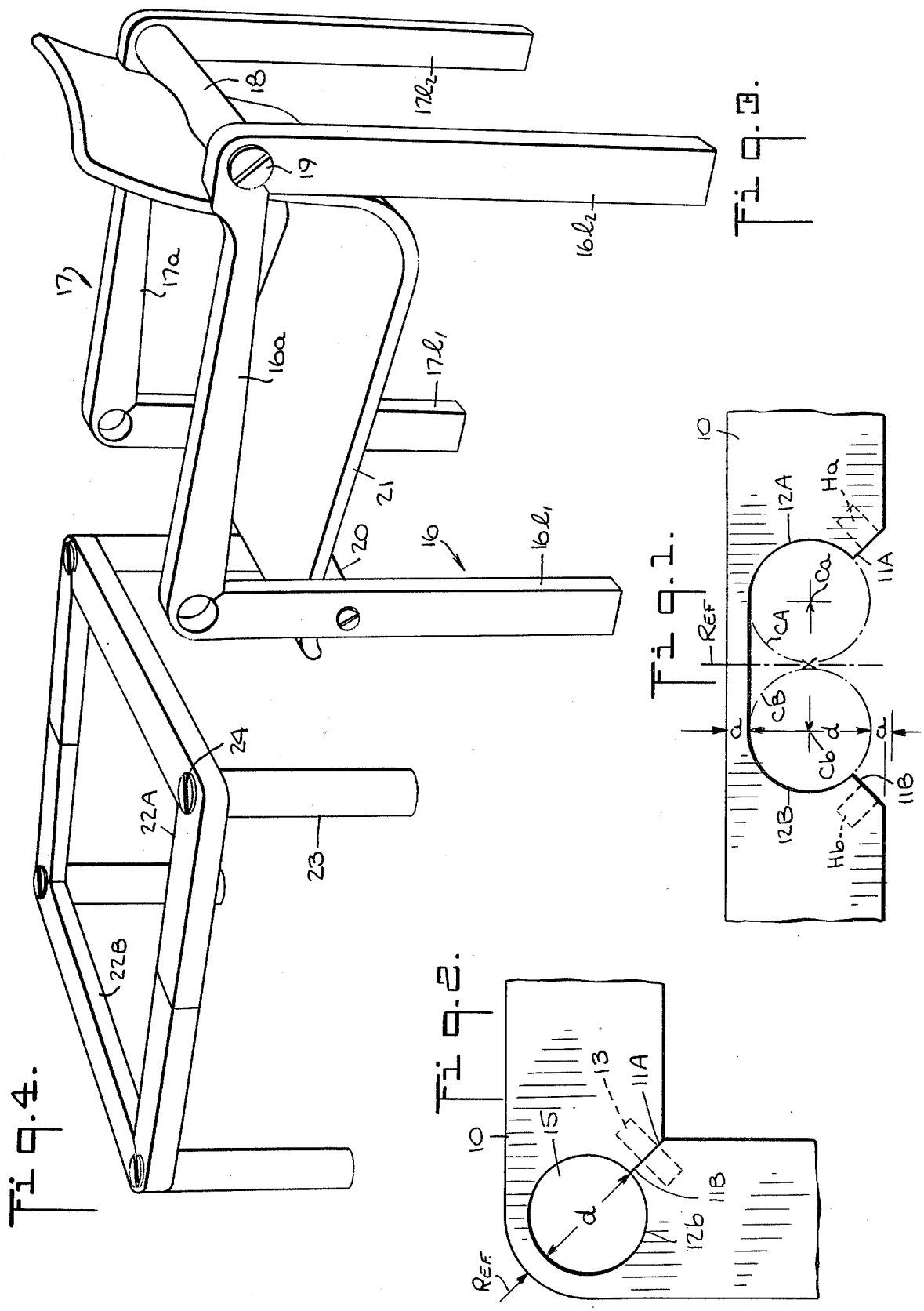

WOODWORKING TECHNIQUE FOR FORMING CORNERS

BACKGROUND OF INVENTION

This invention relates generally to woodworking procedures for forming angled corners, and more particularly to a method by which a continuous piece of wood is converted into a furniture component having one or more angled corners, each of which incorporates a circular socket to receive the end of a leg or stretcher.

In the manufacture of tables, chairs and other wood structures, it is often necessary to provide angled corners usually having a right-angle formation. For example, in the typical table, a rectangular frame is provided for supporting the table board, the legs being secured to the corners of the frame. To this end, the conventional practice is to join together four pieces of wood to form a frame, fixtures for the legs being then secured to the frame corners.

Joints for this purpose are made by traditional methods, such as by dovetailing the pieces or by mitering and dowelling. The joints are locked by adhesive bonding agents whose characteristics in good part determine the rigidity and strength of the joint.

It is also known to produce right-angle corners for frames, chair seats and other wood-formed articles from a continuous piece by first cutting grooves on the inside of the bend and then steaming the wood to facilitate bending of the piece into the desired shape. Wood bending techniques in accordance with this procedure are disclosed in the following prior U.S. Pat. Nos.: Pine, 230,437; Clark, 709,204; Huey, 190,590; Higgins, 249,468 and Owens, 2,081,638.

With the exception of the Pine patent, the corners formed by the techniques disclosed in the above-identified patents do not incorporate a socket in the formed corner to accommodate a leg or stretcher. Hence when legs are required, it becomes necessary to attach fixtures to the corners to receive the legs.

In the case of the Pine patent, arcuate cuts are made in a wood strip at spaced positions therealong, so that when the wood is steamed and then bent, circular openings are formed at the corners for the insertion of chair legs. In the Pine method, the inner side of the right angle corner lies at the tangent of the circular opening; hence the opening at that point is not surrounded by wood and represents a point of structural weakness. Moreover, the absence of wood at the inner side of the corner makes it necessary to lock the opening by means secured to the exterior of the corner.

SUMMARY OF INVENTION

In view of the foregoing, the main object of this invention is to provide an improved method for forming an angled corner in a wood piece, the corner incorporating a circular opening which is spaced inwardly from the inner and outer sides of the corner to afford a high strength socket surrounded by wood.

More particularly, an object of the invention is to provide a woodworking technique for creating corners of any desired angle, the technique making it possible to bend wood pieces whose dimensions are larger than usual, steam being applied only in the region of a transverse reference line with respect to which the corner is formed. A salient advantage of the invention is that the technique is carried out by standard jigs and fixtures and entails no special equipment.

Also an object of this invention is to provide a technique for forming an angled corner whose strength and rigidity is independent of the formed angle and does not depend on bonding agents. Corners made by a technique in accordance with the invention are superior to those of corners produced by traditional methods.

Yet another object of this invention is to provide a technique which converts a straight piece of wood into a structural component having one or more angled corners that incorporate circular openings defining sockets for accommodating legs and stretchers, whereby articles of knock-down furniture may be created from such components which are readily assembled or dismantled.

A salient feature of a corner produced in accordance with the invention is that it possesses an inherently chamfered configuration which contributes to the attractiveness of the design.

Briefly stated, these objects are attained in a technique for producing angled corners in a straight wood piece, which technique involves the formation of a cut-out on the inner side of the piece that is symmetrical with respect to a transverse reference line. The cut-out is constituted by a converging entry zone whose opposing flat sides have complementary angles each equal to one half the desired angle of the corner, the entry zone leading into an oblong interior zone whose opposing arcuate sides follow the curvatures of a pair of circles which are equi-spaced with respect to the outer side of the piece.

The wood bridge joining the arcuate sides of the interior zone is steamed to permit bending thereof to an extent causing the arcuate sides to meet and the flat sides to abut on the reference line, thereby defining a perfectly circular socket for receiving a leg. The corner is locked by means of a dowel inserted in matching holes in the flat sides.

OUTLINE OF DRAWINGS

For a better understanding of the invention as well as other objects and further features thereof, reference is made to the following detailed description to be read in conjunction with the accompanying drawings, wherein:

FIG. 1 shows a straight piece of wood having a cut-out therein whereby the piece may be steamed and bent to form a corner in accordance with the invention;

FIG. 2 shows the right-angle corner formed by bending the straight piece;

FIG. 3 shows a chair which includes a pair of wood components having corners formed therein in accordance with the invention; and FIG. 4 shows a coffee table whose frame is formed in accordance with the invention.

DESCRIPTION OF INVENTION

The Technique

Referring now to FIG. 1, there is shown a straight piece of wood 10 which is to be worked by a method in accordance with the invention to create a right-angle corner. Formed on the inner side of the piece is a cut-out which is symmetrical with respect to a transverse reference line Ref. The cut-out is constituted by a converging entry zone whose opposing flat sides 11A and 11B have complementary 45 degree angles, the entry zone leading into an oblong interior zone whose opposing sides 12A and 12B having arcuate formations that follow the curvatures of a pair of circles CA and CB, the tangents of which are coincident with reference line Ref.

Drilled in flat sides 11A and 11B are matching holes $H_a$ and $H_b$ which are dimensioned to accommodate a dowel 13 which is inserted therein when the sides are brought together. Piece 10 is placed in a suitable bending fixture, and steam is applied to the bridge 14 which interconnects the arcuate sides 12A and 12B of the interior zone.

The applied steam renders the wood of bridge 14 yieldable to permit a bending action without fracture thereof. The wood is bent until arcuate sides 12A and 12B meet to form a circular socket 15, and the flat sides 11A and 11B abut in reference line Ref which is now coincident with the diameter of the circular socket. In practice, any high quality wood of good structural strength may be used, such as oak, birch or beech. After steaming and drying, the grain of the wood which is raised in the course of this operation must be sanded down or reamed to define the exact socket dimension.

In order to create a perfectly circular socket, the geometry of the cut-out must be such that the distance X between the centers $C_a$ and $C_b$ of circles CA and CB in the unbent state of the piece must satisfy the following equation:

$$X = \frac{\pi (3.14) \times (d + 2a)}{D}$$

where d is the diameter of the circles, a is the distance between the circles and the outer side of the piece, and D the denominator is equal to 360 divided by the desired corner angle.

Thus for a right angle corner, D equals 4, for a 120 degree corner D equals 3 in which event the flat sides have complementary 60 degree angles. And if the corner is to have an 80 degree angle, D is 4.5 and the flat sides then have complementary 40 degree angles. It will be evident from this equation that a corner of any desired angle may be created for any decorative or design purpose, the corner in every case having a perfectly circular socket.

APPLICATIONS

Referring now to FIG. 3, there is shown an armchair which includes a pair of U-shaped structural wood components 16 and 17 made in accordance with the invention, each component having two right-angle corners formed therein to define legs $16l_1$, $16l_2$ ($17l_1$ and $17l_2$) and an arm $16a$ ($17a$) integral with the legs.

A stretcher 18 is extended between components 16 and 17 in the ends of stretcher 18 being inserted in the rear sockets of the pieces and held therein by bolts 19, the front sockets in this instance being unused. The front legs are interconnected by a crossbar 20 on which a seat 21 is supported, the back of the seat resting against the stretcher.

It will be appreciated that this armchair is of the knock-down type, for the chair is readily dismantled by unscrewing the stretcher and cross rod from the wood pieces.

Referring now to FIG. 4, which shows a coffee table whose glass top is omitted, the table frame is composed of a pair of wood pieces 22A and 22B each provided with two cut-outs that are bent into right angle corners, the pieces being joined to form a frame having four corners. Fitted into the circular sockets of these corners are legs 23 which are held therein by removable threaded bolts 24. Thus the table is also of the knock-down type and may be readily dismantled. Instead of bolts, the knock-down furniture components may be held together with plastic locking pins or other means. One can also construct a table frame having a hexagonal form in which case the corners will have 120 degree angles.

While there has been shown and described preferred embodiments of a woodworking technique for forming corners in accordance with the invention, it will be appreciated that many changes and modifications may be made therein without, however, departing from the essential spirit thereof. Thus while the invention has been described in connection with woodpieces having a rectangular cross section, the technique is applicable to other cross-sectioned shapes.

I claim:

1. A woodworking technique for forming angled corners in straight pieces of wood, the technique comprising the steps of:
    A. producing a cut-out on the inner side of the piece which is symmetrical with respect to a transverse reference line and is constituted by a converging entry zone whose opposing flat sides have complementary angles, each equal to one-half the angle of the corner to be produced, the entry zone leading into an oblong interior zone whose opposing arcuate sides follow the curvatures of a pair of circles;
    B. steaming the wood section of the piece which bridges the arcuate sides to render it yieldable; and
    C. bending the piece to cause the arcuate sides to meet and the flat sides to abut at the reference line to define a circular leg-receiving socket surrounded by wood.

2. A technique as set forth in claim 1 wherein said flat sides have complementary 45 degree angles to produce a right angle corner.

3. A woodworking technique as set forth in claim 1, further including the step of drilling matching holes in the flat sides to receive an inserted dowel to hold the corner.

4. A technique as set forth in claim 1, wherein said circles are equi-spaced from the outer side of the piece.

5. A technique as set forth in claim 4, wherein the distance X between the centers of the circles is equal to $$\frac{\pi (3.14) \times (d + 2a)}{D},$$

where d is the diameter of the circles and a is the distance of the circles from the outer side of the piece, and D is a denominator equal to 360 divided by the desired angle of the corner in degrees.

6. A technique as set forth in claim 5 wherein D is equal to 3.

7. A technique as set forth in claim 1, in which the piece has two corners formed therein to define two legs and an arm integral therewith to provide a component of an armchair.

8. A technique as set forth in claim 1, in which the piece has four corners therein to define the frame of a table whose legs are inserted in the sockets of the corners.

* * * * *